United States Patent [19]

Ankerman

[11] Patent Number: 4,474,842
[45] Date of Patent: Oct. 2, 1984

[54] LUMBER WRAP

[75] Inventor: John E. Ankerman, Hoffman Estates, Ill.

[73] Assignee: The Cromwell Paper Company, Chicago, Ill.

[21] Appl. No.: 437,570

[22] Filed: Oct. 29, 1982

[51] Int. Cl.³ ............................................. B32B 29/06
[52] U.S. Cl. .................................... 428/211; 428/908; 428/537.1; 428/514; 428/535; 428/537.5; 229/87 R; 229/87 H; 229/3.5 R; 229/DIG. 5; 427/262
[58] Field of Search ................... 428/15, 18, 211, 151, 428/908, 514, 535, 537.5; 229/3.5 R, 40, 87 R, 87 H, DIG. 5; 427/262

[56] References Cited

U.S. PATENT DOCUMENTS

| | | | |
|---|---|---|---|
| 3,334,009 | 8/1967 | Questel et al. | 428/211 |
| 3,547,767 | 12/1970 | Keeling et al. | 428/211 X |
| 3,595,943 | 7/1971 | Brunson et al. | 428/211 X |
| 3,702,278 | 11/1972 | Fitzgerald | 428/151 X |
| 3,969,558 | 7/1976 | Sadashige | 428/58 |

Primary Examiner—Patricia C. Ives
Attorney, Agent, or Firm—Chas. W. Rummler

[57] ABSTRACT

An improved, waterproofed, non-slip, non-skid kraft lumber wrap for covering milled lumber as stacked for shipment on flatbed railroad cars and having a printed application of a high friction material which is applied in the form of a plurality of groups of generally quarter-circular area shapes, the shapes in each group being spaced apart in transverse directions to form a unitary pattern of predetermined total area size which, when repeated on predetermined centers over the central upper side area of the wrap will, when in use, provide an overall non-skid surface for the top surface of the wrap covered lumber stack where workmen are likely to walk during loading and unloading operations, the circular area shapes of each pattern being so arranged that in the overall application of the pattern onto the lumber wrap, the area of an average sized worker's foot, as he walks on the covered lumber stack, will always be in contact with a portion of at least two of the circular shapes comprising the overall application of the high friction coating material.

5 Claims, 1 Drawing Figure

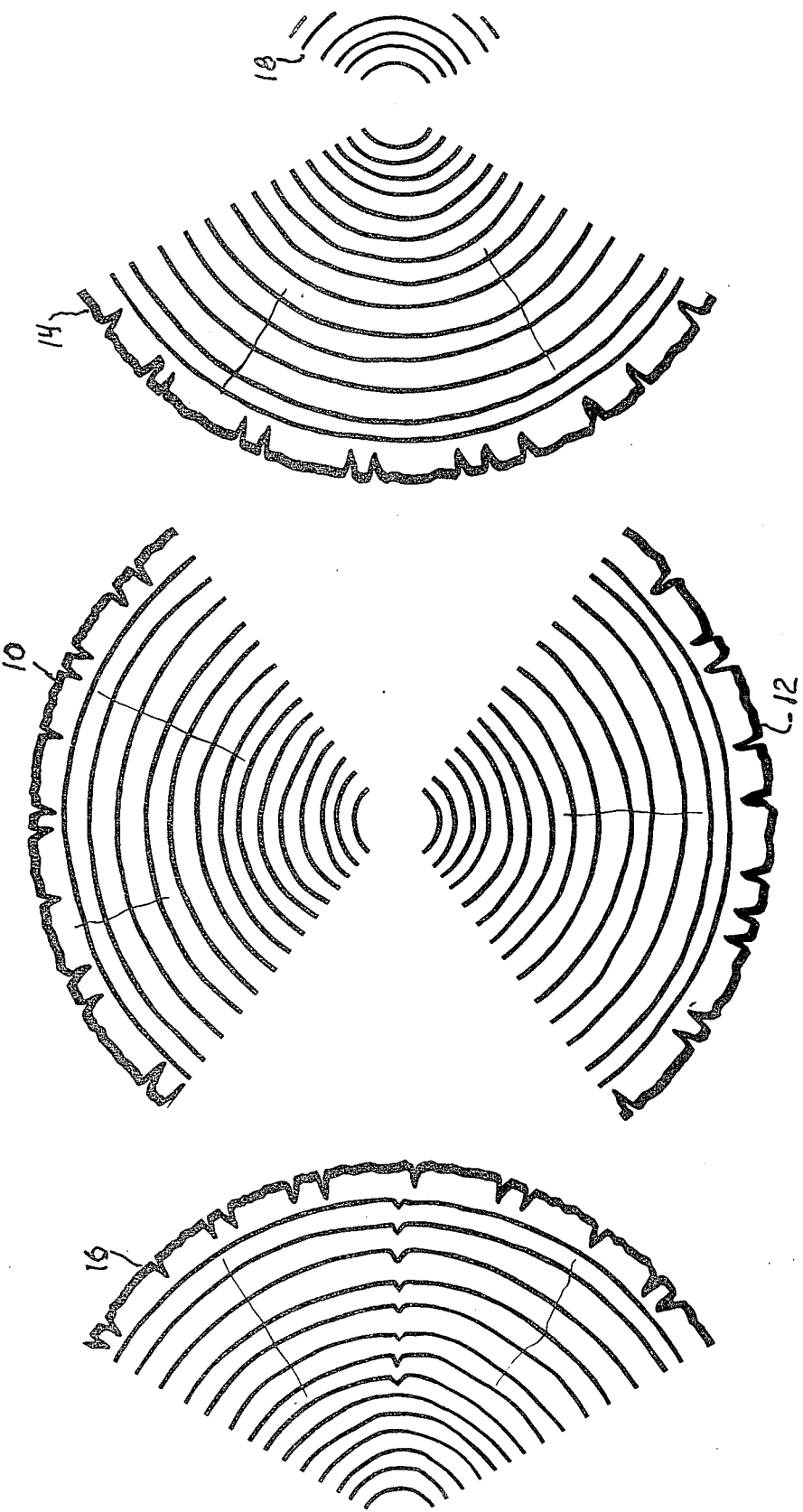

LUMBER WRAP

BACKGROUND OF THE INVENTION

In the shipment of packaged lumber, particularly when the shipment is by means of flatcars, it is highly desirable to provide a non-slip or non-skid property to the lumber wrap to minimize the possible chance of workers slipping during the loading and unloading of the packaged lumber in shipment. This is especially true under wet conditions. It is therefore a common practice for most manufacturers of lumber wraps to apply an anti-skid material to the surface of their products, which is usually done in the form of a printed pattern rather than a continuous coating for economical reasons. Some manufacturers apply their non-skid material in the form of solid stripes spaced apart on centers about three to five times the width of the stripe and extending from side-to-side of the treated area of the lumber wrap web, whereas others utilize a crisscross or a herringbone pattern for the application of their non-skid or non-slip material. In all cases, the non-slip pattern is applied to the center section of the lumber wrap, by a printing technique, so that in use, it is positioned on the top surface of the packaged lumber where workmen are likely to walk.

In any case, the cost of the non-skid, non-slip treatment of the lumber wrap is a very material economic factor and it is thus a particular object of the present invention to provide a non-skid, non-slip treatment for an improved lumber wrap material which will materially reduce the cost of the treatment systems heretofore employed. It is also an object to provide a system of high friction treatment of lumber wrap material which, in combination with the applied non-slip pattern, will be very effective under both wet and dry surface conditions of the wrapped lumber.

SUMMARY OF THE INVENTION

According to the present invention, there is first provided an improved, laminated and fiberglass reinforced, kraft paper web construction having a white hot melt overall barrier coating, or its functional equivalent, the principal functional properties of which are scuff and water resistance. Onto this kraft wrap material, there is applied, by printing techniques, a specially designed pattern of non-skid coating material comprising a non-slip or non-skid latex material (BL-79-2052) such as is manufactured by Basic Adhesives, Inc. of Brooklyn, N.Y., the principal pattern being an arrangement of area shapes each of which is in the form of a quarter-section-like portion of a circular area, these circular area portions being so arranged and spaced to provide a unitary pattern which, when repeated on predetermined centers both transversely and longitudinally of the area of the lumber wrap web to be treated, will provide a non-skid, non-slip treatment such that at any place over the central or tread upon area of the lumber wrap web, an average sized worker's foot would always be in contact with a portion of at least two of the pattern parts no matter where on the top of the packaged lumber a worker may walk or step.

Preferably each pattern comprises four circular area parts, two of which are arranged in diametrically-opposing relation about a common center and the other two sections are arranged in back-to-back relation relative to the first two on a centerline through the said common center, all of said sections being portions of a circular area of the same diametrical size. Preferably the diametrically-opposing circular area sections will each have an angle of 105° and the back-to-back sections will each have an angle of 120°, in order to provide most effective and economical total area coverage.

For example and to be fully effective for its purpose, the pattern of circular area sections will be composed of portions taken from a circular area of approximately twelve and a half inches in diameter and the width of the pattern across the two diametrically-opposing sections will be about twelve and a half inches. The larger 120° sections will be disposed to extend crosswise of the pattern between the diametrically-opposing sections along a line through the common center of the design and the arc of each of these larger back-to-back sections will overlap the circle of the smaller sections by about one-half inch whereby the center-to-center distance between the larger sections 10 and 12 will be approximately twenty-four inches.

Thus, when applied to a forty-eight inch center or working area of a one hundred twenty inch wide lumber wrap web, the patterns of this invention can be applied on twenty-four inch centers in end-to-end relation across the width of the web working area and on approximately twelve and a half inch centers in side-by-side relation in the longitudinal direction of the web.

DESCRIPTION OF THE DRAWING

The single sheet of drawing illustrating this invention shows a typical pattern comprising four quarter-section-like portions of a circle, and, as shown, each section is of a design representing a portion of the sawed end of a log.

DESCRIPTION OF A PREFERRED EMBODIMENT OF THE INVENTION

The pattern of non-slip or friction material shown in the drawing, or its functional equivalent, is intended to be applied by a printing process onto the prepared surface of wrapping material which in general is a laminated reinforced kraft paper product having the prepared working area specially coated for scuff and water resistance.

As shown, the pattern is designed so that it could be repeated in full on a 48″ printing plate and the "quarter sections" comprising the pattern are arranged as from a circle of about 12 inches in diameter and the sections are arranged with their centers about 12 inches apart so that when the pattern is repeated over the entire center area of the wrap as applied to a lumber stack, a normal sized worker's foot would always be in contact with at least a portion of two sections of the overall pattern. To accomplish this and to provide the best coverage, the pattern is made up of two diametrically opposed sections 10 and 12, each of about 120° of angle, and two back-to-back sections 14 and 16, each of about 105° of angle, with their centers on a common center line so that the pattern will repeat on 24 inch centers in the lengthwise direction of that shown in the drawing as fragmentarily indicated at 18.

Each of the pattern sections is made as a series of circular arcs about a common center with a radial spacing of about ¼ to ½ inch, the width of each arc being about ⅛ inch so as to provide ample area for good friction contact with the worker's shoe as he walks on the lumber stack, wet or dry. This pattern is printed in a repeat pattern over the entire center or tread area of the lumber wrap, which is about 45 inches wide, and the pattern is repeated sidewise on about 12 inch centers for the entire length of the wrap.

The pattern may be printed from a non-slip or non-skid natural rubber latex material such as that produced by Basic Adhesives, Inc. of Brooklyn, N.Y., which is identified by their designation "BL-79-2052", its composition being an elastomeric water based coating for application where a non-skid surface is required. The dried film thickness of this printed material is 0.6 mil. and subsequent drying does not alter film thickness. This material is unpatented and no trademark is applied to it.

The improved lumber wrap material is specially prepared for reception of the printed non-skid pattern of this invention by means of a white coating material comprising a 100% solid ethylene-vinyl acetate based hot melt barrier material to which some titanium dioxide is added for opacity and to whiten the product. This coating material is applied in a molten form at 350° F. onto a 40 lb. natural gumming kraft which comprises the top layer of the improved lumber wrap. The loading weight of the white coating is preferably about 20 lbs. per 3000 square feet of coated area.

The basic lumber wrap construction comprises a lamination of 40 lb. natural gumming kraft, fiberglass yarn in tri-dimensional pattern, and 30 lb. natural converting kraft. The fiberglass is made with one inch spacing in machine direction and ¾ inch spacing in diagonal direction; and the laminant consists of 18 lbs. of amorphous polypropylene hot melt.

A particular advantage of the improved lumber wrap of this invention resides in the combination of the novel non-skid pattern of friction grip material and the white frictional coating applied to the 40 lb. kraft top surface of the wrap material whereby an end product having superior wet and dry frictional properties is provided, particularly from the worker safety standpoint. From the cost effectiveness standpoint, the total area coverage of the applied non-skid material according to the "quarter circle" pattern is considerably less than the overall solid strip or herringbone patterns heretofore employed for non-slip lumber wrap. This cost factor alone is an important advantage of the herein disclosed product and this is had with no sacrifice of worker safety.

Although but one specific embodiment of this invention is herein shown and described, it will be understood that details of the construction described may be altered or omitted without departing from the spirit of the invention as defined by the following claims.

I claim:

1. A lumber wrap comprising a reinforced kraft-to-kraft lamination overlaid with a hot melt scuff and water resistant barrier coating of ethylene-vinyl acetate onto which a repeat pattern of pie-shaped circular sections of high friction material is applied by printing, said sections each comprising a plurality of radially spaced, generally angularly parallel lines formed about a common center, said sections being of substantially the same radial dimension and disposed with their centers spaced along a common center line, one pair of said sections being in diametrically opposed position transversely of said center line and having a common center thereon, and another pair of said sections being positioned on said center line in back-to-back relation with the first named pair, said center to center center-line distance between said sections being substantially equal.

2. A lumber wrap as defined by claim 1 wherein the angular dimensions of said circular sections is greater than about 105° and not more than about 120°.

3. A lumber wrap as defined by claim 1 wherein the angular dimension of each of the diametrically opposed sections is about 105° and the remaining sections have an angular dimension of about 120°.

4. A lumber wrap as defined by claim 1 wherein the center to center distance between said sections along said center-line is about 12 inches.

5. A lumber wrap as defined by claim 1 wherein the distance between the radially spaced angularly parallel lines comprising said sections is about ¼ inch to ½ inch in the radial direction.

* * * * *